United States Patent Office 3,816,548
Patented June 11, 1974

3,816,548
CATALYTIC OXIDATION PROCESS FOR
ISOPARAFFIN HYDROCARBONS
Robert H. Williams, Pennington, N.J., and Anthony J. Silverstri, Lower Makefield Township, Bucks County, and Robert L. Gorring, Upper Makefield Township, Bucks County, Pa., assignors to Mobil Oil Corporation
No Drawing. Filed Apr. 27, 1971, Ser. No. 137,959
Int. Cl. C07c 31/12, 27/12
U.S. Cl. 260—632 C          5 Claims

ABSTRACT OF THE DISCLOSURE

A liquid phase oxidation process is provided for oxidation of isoparaffin hydrocarbons of from, for example, 4–16 carbon atoms or more to alcohols as the main product. Said process is preferably carried out at between about 50° C. and about 200° C. and between about 100 p.s.i. and about 1500 p.s.i. in the presence of certain metal phthalocyanines or mixtures thereof as a catalyst.

CROSS-REFERENCE TO RELATED APPLICATIONS

None.

BACKGROUND OF THE INVENTION

Field of the invention

This invention relates to the oxidation of isoparaffin hydrocarbons. It is more particularly concerned with the catalytic oxidation of isoparaffin hydrocarbons of from, for example, 4–16 carbon atoms or more to alcohols in the presence of a phthalocyanine of (a) a metal selected from the group consisting of Group VII–B, metals of the cobalt and iron triads of Group VIII, or (b) a mixture of at least two different metal phthalocyanines of metals from (a), and (c) a mixture of a pathalocyanine of a metal from (a) and a phthalocyanine of a Group I–B metal.

Description of the prior art

It is well known that isobutane may be oxidized by thermal methods to produce t-butyl alcohol and t-butyl hydroperoxide with minor amounts of acetone and di-t-butyl peroxide. It is also known that certain metal salts such as cobalt (II) octoate may be used to increase the overall rate of oxidation of isobutane to t-butyl alcohol product.

Certain metal phthalocyanines are known in the art to oxidize cumene, p-cymene, methyl benzene, ethyl benzene, p-xylene and diphenylmethane (Hock, H. and Kropf, H., J. Prakt. Chem., 9, 173–86 (1959)).

SUMMARY OF THE INVENTION

In accordance with this invention, there is provided an oxidation process employing certain metal phthalocyanines or mixture of certain metal phthalocyanines as catalysts to oxidize isoparaffin hydrocarbons of from, for example, 4–16 carbon atoms or more to an alcohol as the major reaction product. There is also provided an oxidation process employing a synergistic mixture of certain metal phthalocyanines as a catalyst to oxidize said isoparaffin hydrocarbons to an alcohol as the major product. The process of the present invention comprises reacting said isoparaffin hydrocarbon with a free oxygen-containing gas in the presence of an appropriate quantity of said catalysts.

DESCRIPTION OF SPECIFIC EMBODIMENTS

The catalyst for use in the present invention is a metal phthalocyanine, which has the structural formula:

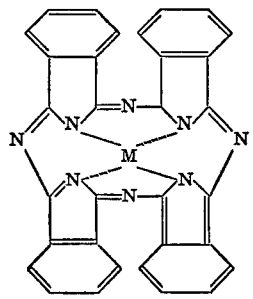

wherein M is a member selected from the group consisting of (a) a Group VII–B metal (e.g., Mn, Tc and Re), metals from the cobalt and iron triads of Group VIII (e.g., Co, Fe, Rh, Ir, Ru and Os) or (b) a mixture of at least two different metal phthalocyanines of metals from (a), and (c) a mixture of a phthalocyanine of a metal from (a) and a phthalocyanine of a Group I–B metal (eg., Cu, Ag and Au). Specific embodiments of this invention include catalysts comprising phthalocyanines of cobalt, iron and manganese used individually or in mixtures, and mixtures of copper phthalocyanine with phthalocyanines of iron or cobalt.

Although the concentration of total catalyst for use in this invention may be varied over a wide range, an amount is generally used that amounts to from about 0.001 to about 5 or more percent by weight of isoparaffin hydrocarbon reactant and preferably from about 0.002 to about 3 percent by weight of isoparaffin hydrocarbon reactant.

An important embodiment of the present invention is that certain mixtures of the aforedefined metal phthalocyanines have been found to provide significant synergistic effects. For such a purpose, the catalyst component may be a combination of at least two of such phthalocyanines in ratios that may vary over a wide range but, usually, in amounts of from about 10 to about 90 percent by weight of one metal phthalocyanine in the catalyst combination. A preferred ratio is about equal parts by weight of the components for the overall catalyst combination. The total amount of said catalyst mixture may be present in the reaction at, for example, from about 0.001 to about 5 or more percent by weight based on the weight of the isoparaffin hydrocarbon reactant and, preferably, from about 0.002 to about 3 percent by weight of isoparaffin hydrocarbon reactant. In example, a 1:1 by weight mixture of cobalt phthalocyanine and manganese phthalocyanine has been found to provide a synergistic catalytic effect for the oxidation of isobutane and, for example, effect oxidation to a rate about 46 to about 79 percent greater (depending upon the reaction time) than the rate achieved with either of said metal phthalocyanines used alone in the same total amount as the combination catalyst.

The oxygen reactant employed in the present invention can be relatively pure oxygen or it can be a gaseous mixture containing free oxygen (e.g., air). The amount of oxygen for use in this invention is at least the stoichiometric amount necessary for reaction, or, preferably, an amount in excess of that stoichiometrically required.

Reaction initiating agents may be used, if desired, in the practice of the present invention and, when used, may be any of many known compounds or other means to form free radicals. Peroxides are suitable examples for such use with non-limiting examples thereof being di-t-butyl peroxide, t-butyl hydroperoxide and others. Such reaction initiating agent, when used, can be used, in example, in amounts of from about 0.1 to about 10.0 percent or more by weight of isoparaffin hydrocarbon reactant.

The oxidation reaction embodied herein is carried out under elevated temperature and in combination with pressure sufficient to maintain a liquid phase reaction with preferred conditions being temperatures about 50° C. to about 200° C., and, more preferably, about 100° C. to about 150° C., a pressure of from about 100 p.s.i. to about 1500 p.s.i. or higher with a preferable pressure range being from about 400 p.s.i. to about 1000 p.s.i.

Reaction temperatures above the critical temperatures of the isoparaffin reactant used may be achieved by the use of inert solvents (e.g., chlorobenzene) or by regulating the composition of the reactor contents, as for example, in a continuous process system, by providing a steady state mixture high in concentration of a compound which would act as a higher boiling solvent (e.g., t-butyl alcohol when isobutane is the reactant isoparaffin hydrocarbon).

The time of the reaction of this invention will vary according to several factors, such as temperature, pressure, presence of reaction initiating agent, catalyst concentration and oxygen concentration. Likewise, the efficiency of the liquid-gas contact is an influencing factor. Thus, in example, when a batch procedure is used, the process may be generally carried out for a period of time varying from about 150 minutes to about 360 minutes or longer. In preferred practice and for optimizing yield of desired product, the preferred reaction time generally approaches about 360 minutes or longer.

The reaction of the present invention may be carried out in either batch or continuous procedure. In a continuous operation, the product alcohol may be separated from the reaction mixture by conventional methods and the remainder of the reaction mixture may be recycled to provide a quantity of initiator and catalyst to the fresh reactants added to the reaction mixture.

The metal phthalocyanine catalysts used in the practice of the present invention may be employed as such or associated with a suitable support or binder, which is thermally stable under the conditions at which the oxidation reaction is carried out, and generally is inert in regard to the oxidation reaction embodied herein. Contemplated for such use are any of various and suitable solid adsorbents, carriers and supports. Non-limiting examples of such support or binder materials include dried inorganic oxide gels and gelatinous precipitates of alumina, silica, zirconia, magnesia, thoria, titania, boria and combinations of these oxides with one another and with other components. Further non-limiting examples of suitable supports include activated charcoal, mulite, bauxite, silicon carbide, sintered alumina and various clays. Also, the metal phthalocyanine may be combined with and distributed throughout a gel matrix by dispersing said metal phthalocyanine in powdered form in an inorganic oxide hydrosol.

Although the process embodied herein is described with particular reference to oxidation of isobutane to produce t-butyl alcohol, a material useful as an additive for improving octane numbers of gasolines, the process is useful for oxidation of other isoparaffins of higher carbon content than isobutane to produce alcohols of higher carbon atom content than t-butyl alcohol. Examples of such other isoparaffins include isopentane, isooctane, 2,3-dimethyl butane, hydrogenated propylenetetramer, hydrogenated tetraisobutylene, hydrogenated polymer gasoline, and others.

The following general procedure and specific examples (Table) demonstrate the process of this invention and effectiveness thereof.

Isobutane is charged into a batch type reactor with a suitable quantity, if desired, of a free radical forming initiator. An oxygen-containing gas is then charged into the reactor at a steady rate. The reaction conditions of temperature and pressure are maintained at suitable levels. In the examples listed in the following Table, the reactor had a 300 ml. capacity, isobutane was charged at 84 grams, initiator (e.g., di-t-butyl peroxide) was charged at 0.5 grams, temperature and pressure were maintained at 125° C. and 600 p.s.i., and the various other conditions were maintained as listed. The metal phthalocyanine catalysts used are commercially available, e.g., from Pfaltz and Bauer, Inc., Flushing, New York.

TABLE.—OXIDATION OF ISOPARAFFIN HYDROCARBONS USING METAL PHTHALOCYANINES AS CATALYSTS

| Ex. | Air, ml./min. | Oxidation catalyst | Catalyst, g. | Percent Conversion | | t-$C_4H_9OH$ | | t-$C_4H_9OOH$ | | $(CH_3)_2CO$ | | (t-$C_4H_9O)_2$ | |
|---|---|---|---|---|---|---|---|---|---|---|---|---|---|
| | | | | 280 min. | 360 min. | 280 min. | 360 min. | 280 min. | 360 min. | 280 min. | 360 min. | 280 min. | 360 min. |
| 1 | 80 | None | | 18.4 | | 9.6 | | 7.2 | | 0.8 | | 0.6 | |
| 2 | 80 | Cobalt octoate | 0.35 | 23.2 | | 16.5 | | 0.4 | | 4.6 | | 1.6 | |
| 3 | 80 | ---do--- | 0.35 | 24.3 | | 15.0 | | 0.4 | | 7.2 | | 1.2 | |
| 4 | 240 | None | | 18.6 | | 13.6 | | 3.4 | | 1.4 | | 0.4 | |
| 5 | 240 | Cobalt phthalocyanine | 1.0 | 38.4 | 44.8 | 27.5 | 32.0 | 1.0 | 1.0 | 8.3 | 11.2 | 0.6 | 0.6 |
| 6 | 240 | ---do--- | 0.1 | 34.8 | 43.6 | 27.2 | 33.5 | 1.9 | 1.9 | 5.4 | 7.8 | 0.6 | 0.6 |
| 7 | 240 | ---do--- | 0.02 | 29.6 | 35.7 | 23.0 | 29.0 | 2.8 | 4.2 | 3.4 | 4.0 | 0.5 | 0.6 |
| 8 | 240 | None | | 15.3 | 22.4 | 9.0 | 13.0 | 5.4 | 8.0 | 0.6 | 1.0 | 0.3 | 0.4 |
| 9 | 240 | Iron phthalocyanine | 0.1 | 30.4 | 40.0 | 20.0 | 28.2 | 4.9 | 5.7 | 4.7 | 5.3 | 0.6 | 0.6 |
| 10 | 240 | None | | 17.6 | 25.4 | 10.7 | 16.0 | 6.6 | 8.8 | 0.7 | 1.1 | 0.3 | 0.3 |
| 11 | 240 | Manganese phthalocyanine | 0.1 | 33.0 | 41.2 | 24.1 | 31.2 | 5.7 | 6.4 | 2.4 | 2.8 | 0.6 | 0.7 |
| 12 | 240 | Cobalt phthalocyanine/manganese phthalocyanine | 0.05/0.05 | 53.5 | 61.5 | 43.2 | 48.8 | 2.9 | 3.0 | 7.3 | 9.2 | 0.5 | 0.6 |
| 13 | 240 | Copper phthalocyanine/cobalt phthalocyanine | 0.05/0.05 | 47.5 | 56.5 | 39.7 | 46.0 | 2.7 | 3.2 | 4.8 | 6.8 | 0.3 | 0.4 |
| 14 | 240 | Copper phthalocyanine/iron phthalocyanine | 0.05/0.05 | 48.5 | 55.0 | 39.0 | 47.0 | 4.2 | 4.1 | 4.9 | 6.0 | 0.4 | 0.4 |
| 15 | 240 | Copper phthalocyanine | 0.1 | 18.0 | 28.0 | 11.7 | 20.5 | 4.9 | 5.7 | 0.8 | 1.7 | 0.4 | 0.5 |

From a comparison of the data of the Table, it will be apparent that the process of the present invention affords excellent yields of alcohols from isoparaffin hydrocarbons, an example of which is t-butyl alcohol from isobutane.

Comparative examples 1, 4, 8 and 10 set forth results obtained by thermal processes for the oxidation of isobutane, and comparative examples 2 and 3 show the increase in product yield over thermal processing when a conventional catalyst, cobalt (II) octoate, is used in the process. The data for the remainder of the examples demonstrate the significantly increased conversion and quantity of desired alcohol product (e.g., t-butyl alcohol) obtained under comparable operating conditions by practice of this invention.

Also, as shown in the Table by the data for examples 12, 13 and 14, a significant synergistic effect is obtained by use of catalyst mixtures as embodied herein; i.e. the quantity of alcohol product (e.g., t-butyl alcohol) is increased significantly over the amount obtained when either of the catalyst components are used alone. Specifically, and as shown, use of a mixture of 0.05 g. of cobalt phthalocyanine and 0.05 g. of manganese phthalocyanine (example 12) provides for isobutane conversion and quantity of t-butyl alcohol to an extent significantly increased over the examples in which 0.1 g. of each catalyst is used individually (examples 6 and 11). Such an increase in yield of desired product is about 79% and 56% when example 12 is compared with example 11 at 280 minutes and 360 minutes reaction time, respectively, and about 59% and 46% when example 12 is compared with example 6 at those two reaction times.

Although the present invention has been described with preferred embodiments, it is to be understood that modifications and variations may be resorted to without departing from the spirit and scope of this invention, as those skilled in the art will readily understand.

What is claimed is:

1. A liquid phase process for the manufacture of alcohols which comprises reacting an isoparaffin with a free oxygen-containing gas at about 50° to about 200° C. in the presence of about 0.0001 to about 5% by weight of said isoparaffin of a mixture of metal phthalocyanine catalyst of the structural formula:

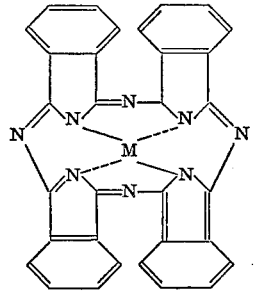

wherein said catalyst is a mixture of such a metal phthalocyanine wherein M is cobalt with such a metal phthalocyanine wherein M is manganese.

2. A process as defined in claim 1 wherein said reaction is carried out in the presence of from about 0.1 to about 10.0 percent, by weight of said isoparaffin hyrdocarbon reactant, of a free radical forming initiator selected from di-t-butyl peroxide and t-butyl hydroperoxide.

3. A process as defined in claim 1, wherein the reaction pressure is from about 100 p.s.i. to about 1500 p.s.i.

4. A process as defined in claim 1, wherein said catalyst mixture is present at from about 0.002 to about 3 percent by weight of said isoparaffin hydrocarbon reactant, said reaction temperature is from about 100° C. to about 150° C., and said pressure is from about 400 p.s.i. to about 1000 p.s.i.

5. A process as defined in claim 1, wherein said catalyst mixture is a 1:1 by weight mixture of cobalt phthalocyanine and manganese.

References Cited

UNITED STATES PATENTS

| | | | |
|---|---|---|---|
| 3,470,239 | 9/1969 | Russell | 260—632 C |
| 3,007,944 | 11/1961 | Amir | 260—632 C |
| 3,391,190 | 7/1968 | Kilsheimer | 260—632 C |
| 3,391,214 | 7/1968 | Fetterly | 260—632 C |
| 3,666,815 | 5/1972 | Scheltus | 260—618 C |
| 2,954,405 | 9/1960 | Hock et al. | 260—618 C |
| 2,967,897 | 1/1961 | Sharp et al. | 260—632 C |
| 3,109,800 | 11/1963 | Sharp | 260—632 C |

JOSEPH E. EVANS, Primary Examiner

U.S. Cl. X.R.

252—431 N; 260—597 R, 610 B

PO-1050
(5/69)

UNITED STATES PATENT OFFICE
CERTIFICATE OF CORRECTION

Patent No. 3,816,548            Dated June 11, 1974

Inventor(s) ROBERT H. WILLIAMS, ANTHONY J. SILVESTRI and ROBERT L. GORRING

It is certified that error appears in the above-identified patent and that said Letters Patent are hereby corrected as shown below:

Column 6, line 14 "maganese" should be -- manganese phthalocyanine --.

Signed and sealed this 26th day of November 1974.

(SEAL)
Attest:

McCOY M. GIBSON JR.
Attesting Officer

C. MARSHALL DANN
Commissioner of Patents